Jan. 30, 1968    R. COTTIER    3,365,821
FOOTWEAR AND METHOD OF MAKING SAME
Filed Aug. 28, 1963    3 Sheets-Sheet 1
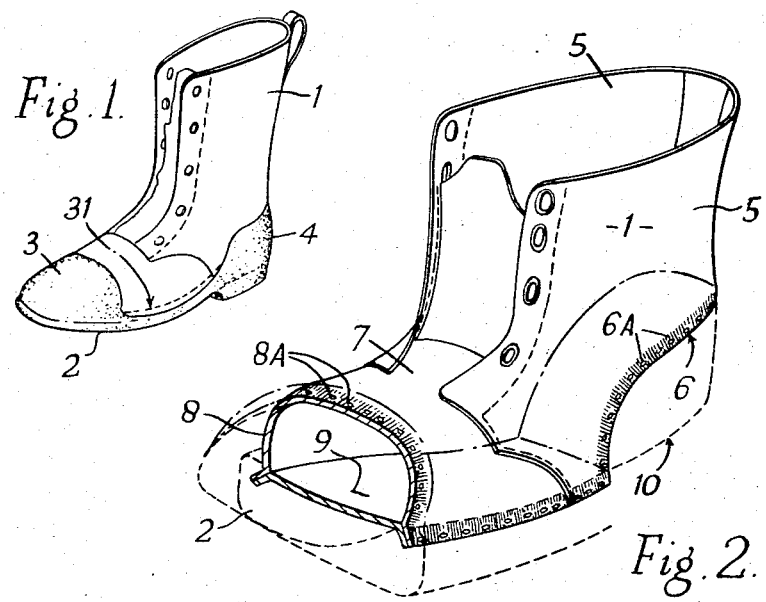
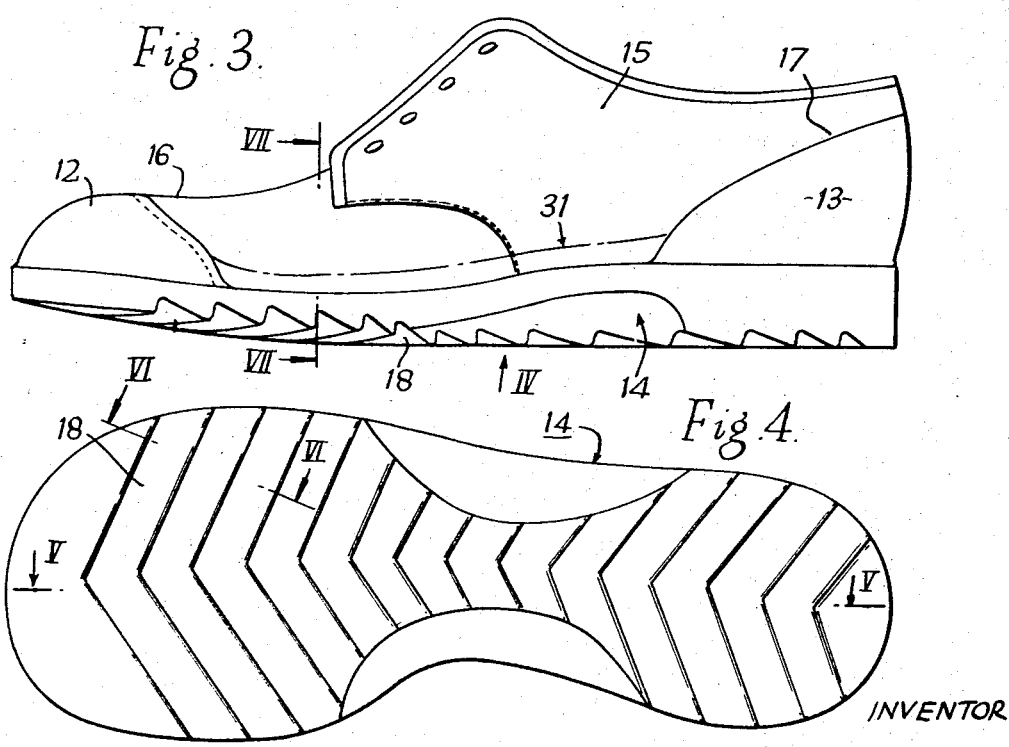
INVENTOR
Robert Cottier
BY
Wadsworth, Lind & Pomack
ATTORNEYS Jan. 30, 1968   R. COTTIER   3,365,821
FOOTWEAR AND METHOD OF MAKING SAME
Filed Aug. 28, 1963   3 Sheets-Sheet 2
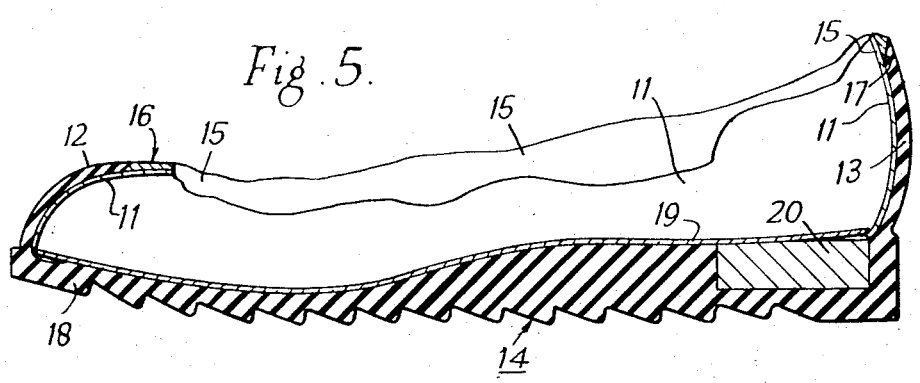
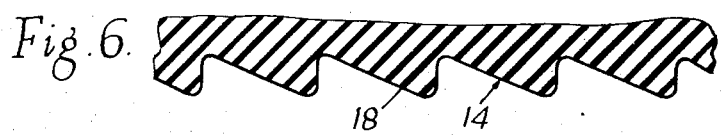
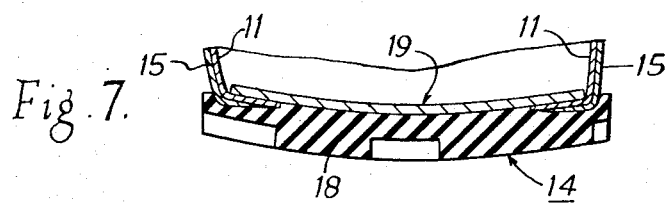
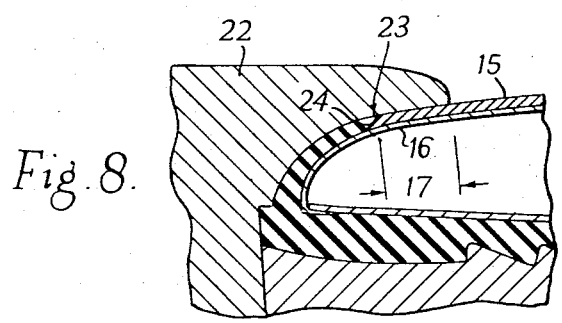
INVENTOR
Robert Cottier
BY
Wenderoth, Lind & Ponack
ATTORNEYS INVENTOR
Robert Cottier
BY
Wenderoth, Lind & Ponack
ATTORNEYS

United States Patent Office 3,365,821
Patented Jan. 30, 1968

3,365,821
FOOTWEAR AND METHOD OF MAKING SAME
Robert Cottier, Bath, Somerset, England, assignor to C.I.C. Engineering Limited, Somerset, England, a British company
Filed Aug. 28, 1963, Ser. No. 305,132
9 Claims. (Cl. 36—4)

This invention relates to the manufacture of boots, shoes and slippers (hereinafter referred to as footwear) of the kind in which an upper construction or assembly is provided with a sole unit of elastomeric or thermoplastic material moulded and bonded directly to said upper.

The invention is concerned more particularly with footwear of the aforesaid kind in which the tread surface of said sole unit is provided with integral extensions. Hitherto these integral extensions of the tread surface of the moulded sole unit have been arranged so as to overlie certain areas of the upper, namely in the toe and/or heel regions. Footwear made in this known manner has accordingly had two layers of material in the toe and/or heel regions (ignoring for the present any lining in the upper) and while this two-layer construction may possess some advantages in certain types of footwear—such as heavy industrial boots—the two layers are unnecessary in many cases, that is, in lighter footwear.

An object of the present invention lies in the provision of improved footwear, wherein an upper composed of leather, textile fabric or sheeted plastic material (such as, for example, polyvinyl chloride or from combinations thereof) may be readily combined in a simple and economic manner with a moulded sole unit comprising a tread surface with integral extensions formed preferably simultaneously during the moulding of the tread surface and constituting in the finished footwear unitary portions of the footwear upper.

Accordingly the present invention provides footwear characterised in that parts of the upper thereof are constituted by extensions of the tread surface of a sole unit, bonded to the upper by direct-on moulding.

In some cases the footwear comprises an upper assembly having bonded thereto by direct-on moulding a sole unit comprising a tread surface and extensions adapted to extend into toe and/or heel areas which normally would be occupied by portions of the upper assembly, said upper assembly including an outer element and an inner element, the latter of which extends beyond the former into said area or areas. The sole unit extensions overlap marginal portions of the upper assembly, the overlapping marginal portions being bonded together.

More particularly footwear according to the invention comprises an incomplete upper assembly including a fore-shortened insole, a toeless vamp and cutaway quarters and a sole unit directly moulded onto said incomplete assembly, said sole unit having integral extensions which constitute the missing parts of the complete upper assembly and which overalp marginal portions of said vamp and quarters.

It will be appreciated therefore that in some cases, that is when a leather upper is used the conventional steps of toe lasting and seat lasting are not required and conventional upper stiffening components (such as, for example, toe puffs and heel seat counters) need not be employed. The footwear upper would then be terminated where the toe and/or heel portions usually commence, and said upper may be slip lasted, or alternatively, attached to a slip-lasted lining prior to the application of the moulded tread surface and its integral extensions. The peripheral boundaries of the upper which are adapted to be attached to the said moulded extensions may be perforated to permit the entrapment of the moulded material in reinforcement of an adhesive bond.

The present invention also provides methods of making footwear as above described and comprising broadly the steps of assembling an incomplete upper to a last and bonding thereto by direct moulding a sole unit having integral extensions which is in the finished footwear provide missing parts of the incomplete upper.

The incomplete upper may comprise a one-piece moulded component (for example, in the case of a "Wellington" boot), or a plurality of components which together form a unitary though toeless and/or heel-less upper.

More particularly, in the abovementioned method the insole portion of an incomplete upper may have marginal portions joined to corresponding facially-abutting marginal portions of a toeless vamp and/or cutaway quarters, the joined marginal portions of said insole and said vamp and/or quarters becoming embedded in the tread surface of the directly moulded on sole unit.

In order that the invention may be readily understood some embodiments thereof will now be described, by way of example, with reference to the accompanying drawings wherein:

FIGURE 1 is a perspective view of an industrial type of boot,

FIGURE 2 illustrates a boot upper ready for sole moulding,

Figure 9:
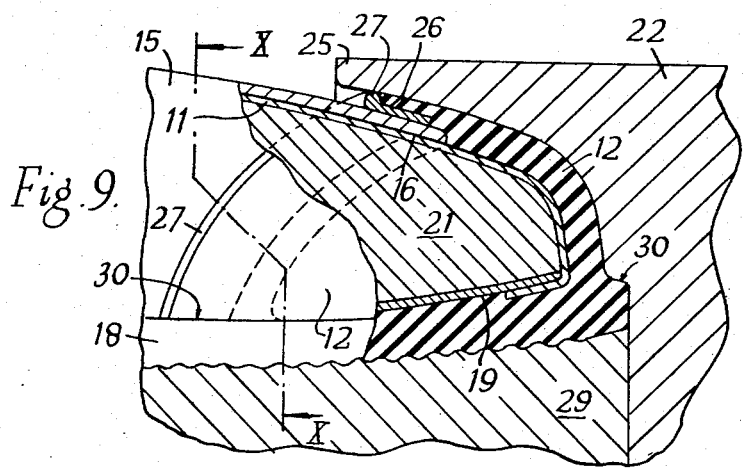
Figure 10:
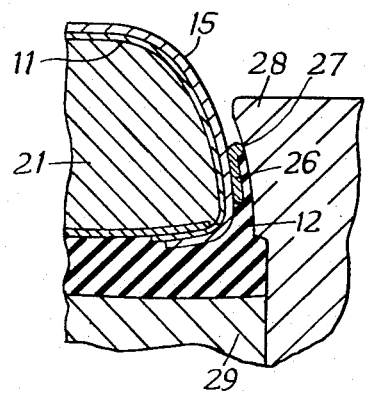
Figure 11:
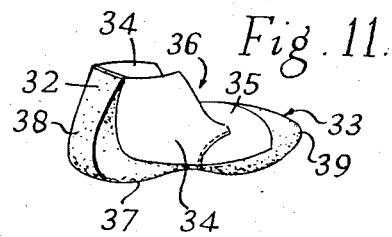

FIGURE 3 is a side view of a lightweight shoe having a moulded ribbed sole unit, FIGURE 4 is a view of the underside of the sole unit, looking in the direction of arrow IV in FIGURE 3, FIGURE 5 is a fragmentary longitudinal section on line V—V in FIGURE 4, FIGURES 6 and 7 are detail cross sections on line VI—VI in FIGURE 4 and line VII—VII in FIGURE 3 respectively, FGURE 8 is a fragmentary longitudinal section through the toe end of a mould suitable for moulding the sole unit shown in FIGURES 3 to 7, FIGURE 9 is a view similar to FIGURE 8, showing the application of a sealing strip between a marginal portion of an upper and the corresponding sole unit extension, FIGURE 10 is a transverse section on line X—X in FIGURE 9, and FIGURE 11 is a perspective view of a known type of infant's shoe.

The industrial type boot shown in FIGURE 1 comprises an upper assembly 1 to which is joined by direct moulding a sole and heel unit (for convenience generally called a sole unit 2) having extended portions 3 and 4 adapted to form the toe and heel seat regions respectively of the boot. The sole unit 2 and its extensions 3, 4 may be formed of any suitable mouldable material but are preferably composed of an injectable thermoplastic compound, such as a polyvinyl chloride.

The upper assembly 1 may conveniently be composed, as shown in FIGURE 3, of two quarters 5 which terminate at a margin 6 and of a vamp 7 which terminates at a margin 8, closing of the upper being effected in normal manner, although, as lasting of the toe and heel is not required, the lasting step is reduced to the attachment of lower margins of the vamp and quarters to a partial or fore-shortened insole member 9.

If required a slip-lasted lining 10 may be employed which extends beyond the margins 6 and 8 of said quarters and vamp respectively. The lining 10 may be adapted to provide a degree of stiffening in the toe and heel regions when treated, in those regions, with a thermosetting "liquid-puff" of known kind.

Additionally, or alternatively, the toe extension 3 may conceal by enclosure a protective toe-cap (not shown in FIGURES 1 and 2) preformed to the required last shape. Where the lining 10 is employed the protective toe-cap may be superposed upon the lining while the lining is supported on a last, the toe-cap, lining, and incomplete upper being then placed in a suitable mould. Areas of the upper 1 adjacent the margins 6 and 8 may be provided with, as shown, perforations 6A and 8A respectively into which "pegs" of sole unit material penetrate. The margins 6 and 8 are preferably skived and roughed to ensure satisfactory bonding between the moulded sole unit extensions 3, 4 and the material of the upper 1 overlapped thereby, so as to blend the dissimilar materials smoothly together without any abrupt change in section.

Possibly the most suitable method of moulding the sole unit 2 with its extensions 3, 4 is that of injecting a thermoplastic material (such as a polyvinylchloride) while the upper assembly is enclosed in a mould comprising a last or form to support the upper and any lining and/or protective toe-cap employed, and mould components adapted to close forcibly onto said upper assembly to enclose the aforesaid skived and/or perforated margins and to define a cavity in which the sole unit 2 and its integral extensions 3, 4 are to be formed by moulding.

An alternative method is that of compresison moulding using apparatus of the kind used conventionally for the direct moulding and vulcanising of rubber soles and heels onto footwear uppers, some mould components being fashioned to provide recesses within which the sole mould extensions 3 and 4 are moulded integrally with the tread surface of the sole unit.

FIGURES 3 to 7 show in greater detail a light-weight shoe made in accordance with the invention, and generally similar to the boot constructions illustrated in FIGURES 1 and 2 in that for secure bonding or union of upper and sole unit extensions overlapping marginal portions are used, preferably with perforations in the upper to receive keying "pegs" integral with the moulded sole unit extensions. The shoe illustrated in FIGURES 3 to 7 differs mainly in the use of a sock 11 forming an inner upper element, said sock 11 constituting a partial or complete lining for an outer upper element 15, which is toeless and heel-less.

It will be seen from FIGURE 5 that the sole unit 14 has toe and heel extensions 12 and 13 respectively which overlap margins of element 15. The marginal portions 16, 17 of extensions 12, 13 respectively may optionally have skived edges. In this construction the inner upper element or sock lining 11 extends across the overlapping edges of said upper element 15 and the extensions 12, 13 which are moulded integrally and simultaneously with said sole unit tread surface 18, and also covers the inner face of the tread surface 18 of the sole unit 14 and serves as an insole.

Although the sock lining 11 could be extended to cover the inner face of the tread surface 18 it may be preferred, as shown, to use a thin insole 19 which is lapped over its peripheral edge by the margin of the lining 11. The lining 11 may be adhesively secured within the leather or other outer upper element 15. It may be desirable, as shown, to embed a heel block 20 within the heel end of the tread surface.

It will be understood that where a toeless and/or heel-less outer upper element 15 is employed the upper assembly cannot be stretched over a last 21 to the same extent as is possible when there are toe and heel portions to be "pulled-over," and there may be some tendency for the upper element 15 to creep back slightly over the face of the last 21. It is therefore important for moulding equipment used to include wall surfaces which well overlap the outer upper element 15 at whatever position on the last 21 it assumes, so as to ensure effective sealing against spewing of the elastomeric or thermoplastic substance being moulded to form the sole unit. FIGURE 8 thus shows how the toe extension portion 22 of the sole unit mould is formed with a wall surface 23 which extends well beyond the margin 16 of the outer upper element 15, thereby providing an ample length 17 of sealing. The skiving on the edge 24 of upper element 15, as shown, is optional; this edge could be arranged substantially normal to the tangent of the last curvature at this point.

Another mode of ensuring that any slight variation in the position of the upper on the last, such as would prevent full closure of the mould cavity, is to use a separate yieldable element to act as a seal at the lip 25 of the mould component which moulds a sole unit extension. Such a yieldable element is conveniently supplied as a strip 26 and a suitable form is already readily available as a so-called welt strip, as this possesses a yieldable or resilient edge rib 27 onto which the mould components may clamp, as shown in FIGURES 9 and 10, where toe extension mould portion 22 may be separate from the conventional side moulds 28 employed or may be formed of parts of such side moulds; a conventional form of sole mould 29 is shown. The sealing strip 26 which may be secured by adhesive or sewn to the outer upper element, may terminate at the "welt" face 30 of the tread surface. Alternatively the footwear may be provided with shallow fence portions 31 which extend, without a break if desired, along opposite sides of the sole unit 14 to join with the toe and heel extensions 12, 13, said fence portions 31 being moulded integrally with said extensions. Such fence portions 31 are indicated by chain-dot lines in FIGURES 1 and 3. Where such shallow fence portions 31 are provided the sealing strip 26 may be used along the rims of the fence portions 31 as well as along the rims of the toe and heel extensions.

The invention is also applicable to lightweight shoe constructions such as for example an infant's shoe of the kind shown in FIGURE 11 where a vertically extended combined heel and back portion 32 and a toe portion 33 are required to provide protection to the wearer's foot and to afford abrasion resistance to the upper. Such construction may include a main assembly of quarters 34 and a vamp 35 and may be fully slip-lasted or string-lasted upon the last or form used in the mould construction. Where, as shown in FIGURE 11, the combined heel and back portion 32 is arranged to extend from the heel proper throughout the height of the upper 36 the quarters 34 and 35 may be loosely joined at the back seam before the moulding of the sole unit 37 with its integral extensions 38, 39 one of which forms said portion 32, said quarters 34 being secured together by the said portion 32 when removed from the mould. In the construction of infant's footwear shown in FIGURE 11, the extremities of the upper may be terminated in manner similar to that shown in FIGURE 3 and the margins may be similarly roughed, skived and/or perforated.

In any of the constructions illustrated and described above by way of example, the upper may be supported, in the mould, upon a resilient form, made from rubber or the like, to ensure an adequate "nip" between the confining margins of the mould cavity and the upper material. Where the upper material is of a thermoplastic material the use of a metallic upper-supporting last or form is preferred which includes means for obtaining local heating in those areas of the upper to be joined to the moulded sole unit to ensure adequate bonding or union of the upper and the mouldable material.

From the foregoing description it will be appreciated that the invention offers simplified footwear constructions in which the quantity of upper material required may be significantly reduced and where the lasting steps may also be reduced to a simple operation executed upon a margin extending between the margins 8 and 6 of the vamp and quarter respectively.

I claim:
1. Footwear comprising an upper assembly having bonded thereto by direct-on moulding a sole unit comprising a tread surface and extensions adapted to extend into at least one of the toe and heel areas which normally would be occupied by portions of the upper assembly, said upper assembly including an outer element and an inner element, the latter of which extends beyond the former into said area or areas.

2. Footwear as claimed in claim 1, in which said sole unit extensions overlap marginal portions of said outer element of the upper assembly, the overlapping marginal portions being bonded together.

3. Footwear comprising an incomplete upper assembly including a foreshortened insole, a toeless vamp and cutaway quarters and a sole unit directly moulded onto said incomplete assembly, said sole unit having integral extensions which constitute the missing parts of the complete upper assembly and which overlap marginal portions of said vamp and quarters.

4. Footwear as claimed in claim 3, characterised in that the sole unit extensions are formed integrally with a fence which extends substantially continuously around the perimeter of the tread surface of the sole unit.

5. Footwear as claimed in claim 3, in which the marginal portions of the upper assembly are provided with perforations or the equivalent into which penetrates material forming part of the overlapping sole unit extensions to key said moulded extensions to said upper assembly.

6. Footwear as claimed in claim 3, incorporating a strip of material forming a sealing element at the marginal edge of the upper assembly.

7. A method of making footwear which comprises providing an incomplete upper by providing a plurality of components which together form a unitary upper having at least one of the toe and heel areas omitted therefrom; assembling said incomplete upper to a last; and bonding thereto by direct molding a sole unit having integral extensions which in the finished footwear provide missing parts of the incomplete upper.

8. A method of making footwear which comprises providing an incomplete upper by providing a toeless vamp, cut-away quarters, and an insole portion; assembling said incomplete upper to a last by joining the marginal portions of the insole portion to corresponding facially abutting marginal portions of the toeless vamp and cut-away quarters; and bonding thereto by direct molding a sole unit having integral extensions which in the finished footwear provide missing parts of the incomplete upper by embedding the joined marginal portions of the insole and said vamp and quarters in the tread surface of the directly molded on sole unit during said direct molding step.

9. A method of making footwear which comprises providing an incomplete upper and assembling said incomplete upper to a last by applying an inner element forming a liner in the finished footwear to the last, next assembling an outer upper element over the inner liner-forming element so as to cover only parts thereof; and then bonding thereto by direct molding a sole unit having integral extensions which in the finished footwear provide missing parts of the incomplete upper by directly molding the sole unit onto portions of the inner element in such a manner that the integral extensions of the tread surface of said sole unit cover said portions of the inner element left exposed after assembly of said outer element.

References Cited
UNITED STATES PATENTS

| | | | |
|---|---|---|---|
| 895,284 | 8/1908 | Morris et al. | 36—4 |
| 2,403,442 | 7/1946 | Klaus | 36—2.5 |
| 2,428,626 | 10/1947 | Jaeger et al. | 36—4 |
| 2,798,312 | 7/1957 | Muller | 36—2.5 |
| 2,981,011 | 4/1961 | Lombardo | 36—59 |
| 3,006,085 | 10/1961 | Bingham | 36—59 |
| 3,047,890 | 8/1962 | Bingham | 12—142 |
| 3,052,903 | 9/1962 | La Rose | 12—142 |

PATRICK D. LAWSON, *Primary Examiner.*

G. V. LARKIN, *Examiner.*